Sept. 2, 1924.
A. WESSIG
1,506,797
SIGNAL FOR ROAD VEHICLES
Filed Oct. 23, 1920
3 Sheets-Sheet 1
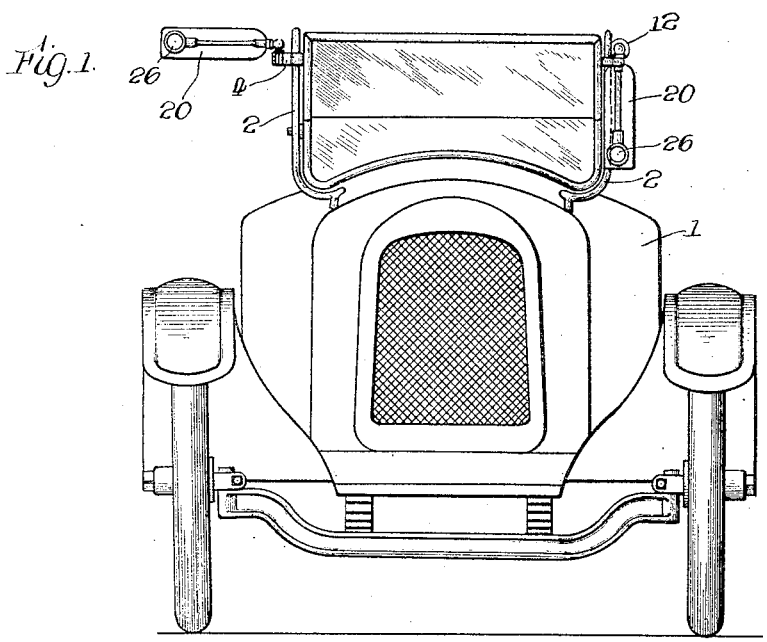
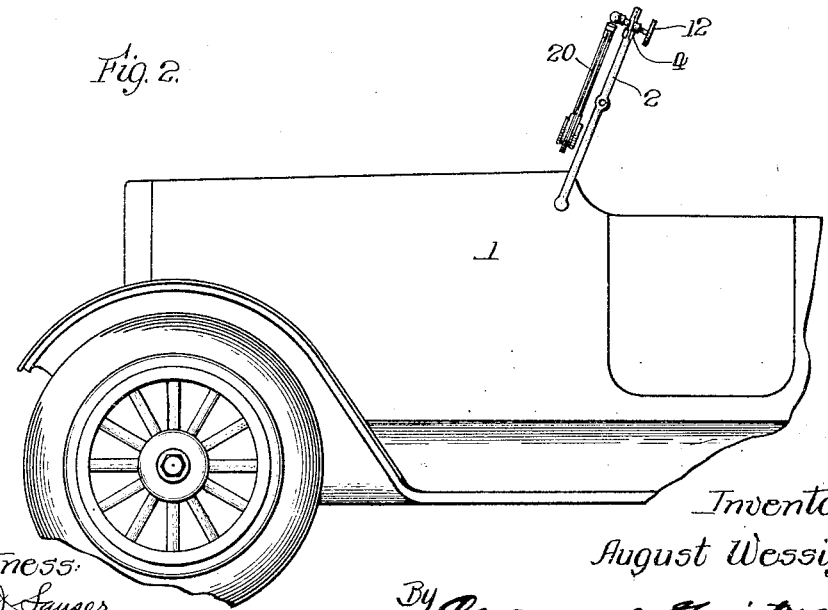
Inventor:
August Wessig, Sept. 2, 1924.
A. WESSIG
1,506,797
SIGNAL FOR ROAD VEHICLES
Filed Oct. 23, 1920
3 Sheets-Sheet 2
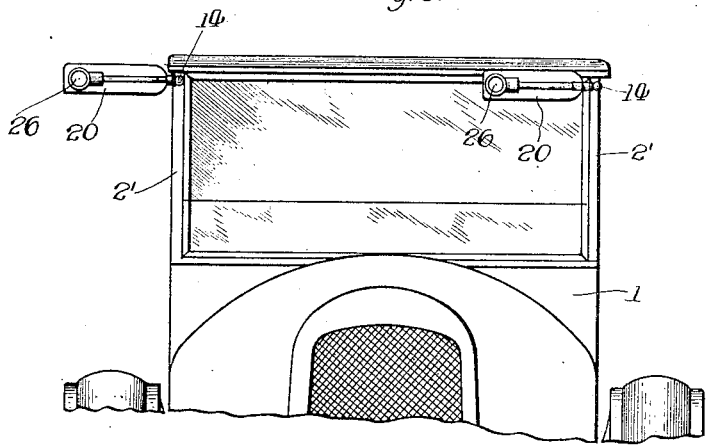
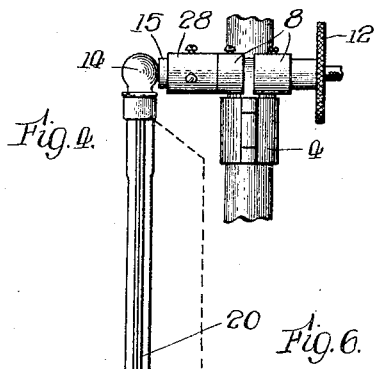
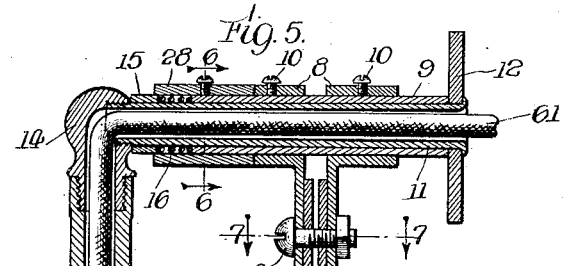
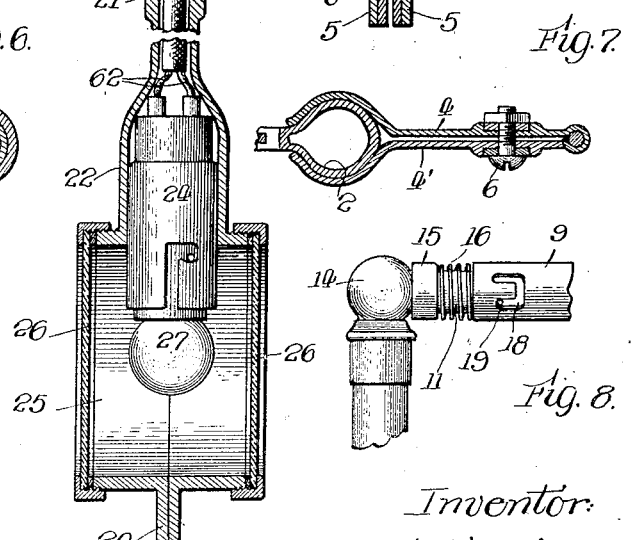
Inventor:
August Wessig,
By Cromwell, Greist & Warden
Attys.
Witness:
A. J. Sauser Sept. 2, 1924.  1,506,797
A. WESSIG
SIGNAL FOR ROAD VEHICLES
Filed Oct.   3 Sheets-Sheet 3
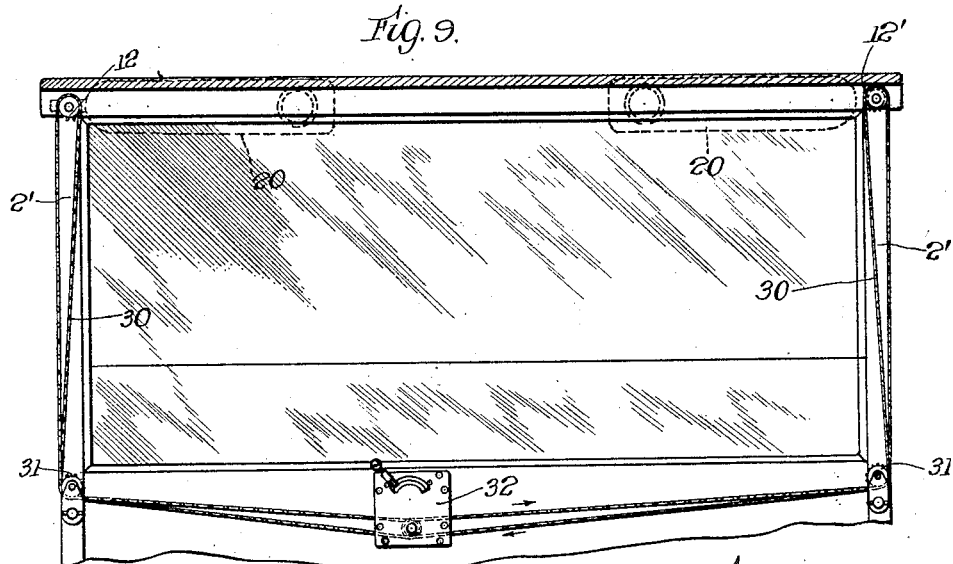
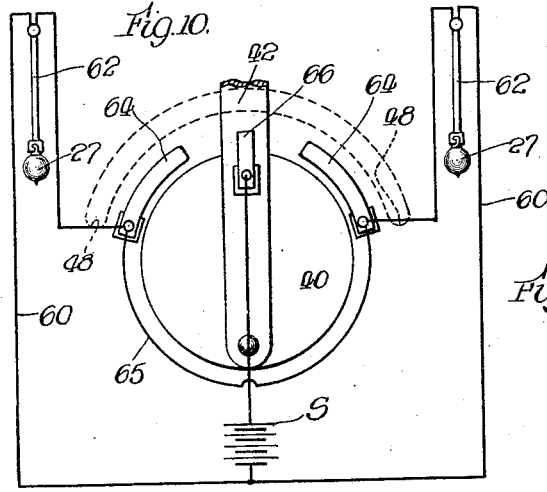
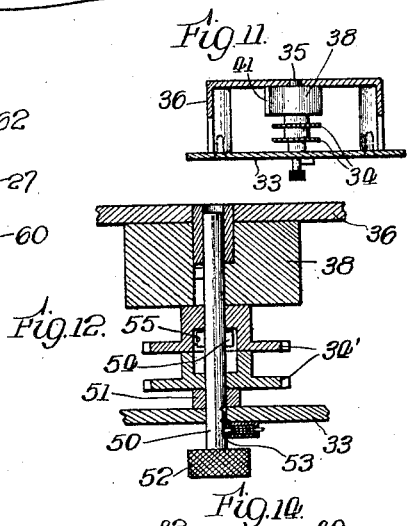
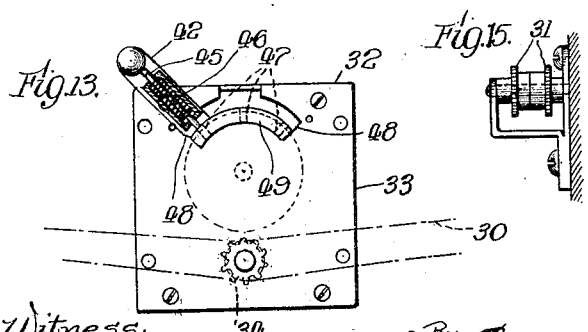
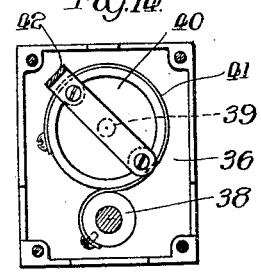
Inventor:
August Wessig,
By Cromwell, Greist & Warden
Attys.

Patented Sept. 2, 1924.

1,506,797

UNITED STATES PATENT OFFICE.

AUGUST WESSIG, OF CHICAGO, ILLINOIS.

SIGNAL FOR ROAD VEHICLES.

Application filed October 23, 1920. Serial No. 418,954.

*To all whom it may concern:*

Be it known that I, AUGUST WESSIG, a citizen of Germany, residing at Chicago, in the county of Cook and State of Illinois, have invented certain new and useful Improvements in Signals for Road Vehicles, of which the following is a specification.

This invention relates to direction signals for use on vehicles, and has as its general purpose the provision of apparatus for enabling the operator of the vehicle to indicate to others his intended movements, such as turns, stops, changes of speed and the like, which may be operated by manipulations easily performed without interference with his operation of the vehicle.

One of the objects of the invention is the provision of such an apparatus which may be attached without extensive modification or change, to any kind of vehicle, and may be operated effectively from within a closed body. Another object comprises the provision of such an apparatus which may be used effectively either in the light or the dark to give the proper indications, and when used in the dark is effective to attract attention to the signal. Another object is the provision of such an apparatus adapted to employ effectively lights as signal elements without imposing a demand upon the vehicle lighting system materially in excess of the ordinary lighting requirements.

Still another object of the invention is the provision of such an apparatus which permits the disposal of the manipulative means whereby it is operated at any point convenient to the operator, which is adapted to display signals at both sides of the vehicle or either side selectively; which is adapted to be so disposed as not to interfere with any use of the vehicles and not to injure or detract from its appearance from an artistic or mechanical standpoint, and which may be constructed in such substantial fashion as to withstand the intended usage and the constant and more or less violent vibrations, shocks, wind-pressure and other conditions met in the usage of a road vehicle.

Still other objects of the invention reside in the advantages secured by improved and novel construction of the apparatus.

Described generally, the invention contemplates the provision of one or more semaphore arms adapted to be pivotally mounted on the windshield frame or other suitable side, front or rear portion of a vehicle in such fashion as to lie, when in inoperative position, close to the same, and means operable from a point convenient to the driver of the vehicle for swinging the semaphore arm or arms, selectively or conjointly, to their operative positions in which they extend outwardly from the vehicle body in a conspicuous position where they may be seen from the front or rear of the vehicle. For the purpose of signalling in the dark, each arm is equipped with a lamp which may be energized from a source carried on the vehicle, and which, in customary practice, will consist of the electrical equipment, and means provided for opening the circuit connection to said lamps when the semaphore arm or arms are in ineffective position and to close the lamp circuits during the movement of the arm or arms to the signalling position.

The invention and the several novel features thereof will be more fully understood by reference to the accompanying drawings forming a part of this specification, wherein an illustrative embodiment is shown, and further objects of the invention will be obvious therefrom or indicated in the appended claims. While the present disclosure is directed to a preferred form and certain modifications, it is to be understood that the same is intended as illustrative of the invention and is not to be considered exhaustive of its forms of embodiment or as definitive of its scope.

In the drawings—

Fig. 1 is a front view of an automobile, equipped with an embodiment of my improved direction signal;

Fig. 2 is a part side elevation of the same;

Fig. 3 is a part front elevation of an automobile showing an arrangement of signal apparatus adapted for closed vehicle bodies.

Fig. 4 is a side elevation of a semaphore arm and its mounting;

Fig. 5 is a fragmentary longitudinal section of the same;

Fig. 6 is a cross section on lines 6—6 of Figs. 4 and 5;

Fig. 7 is a cross section on lines 7—7 of Fig. 5;

Fig. 8 is a detail elevation of the pivot end of a semaphore arm;

Fig. 9 is a sectional elevation through a vehicle body looking toward the front at the dashboard;

Fig. 10 is an elevation of a manipulative device for operating the signal showing diagrammatically the circuit connections;

Fig. 11 is a cross section of one form of a manipulating device;

Fig. 12 is a detail of a modified form of manipulating device;

Fig. 13 is a front view of a manipulating device partly in section;

Fig. 14 is an interior elevation of the manipulating device; and

Fig. 15 is a side view of a guide for a part of the operating mechanism.

Referring to these drawings by means of the reference characters applied, let it be understood that the numeral 1 designates generally the body portion of a vehicle carrying lateral supports 2, shown in Figs. 1 and 2 as the bracket rods carrying the windshield trunnions. Mounted on each of these supports is a bracket comprising a pair of arms 4 and 4′ hinged together and constrained towards each other between a pair of extension members 5 by a clamp screw 6, the free ends of the arms 4 and 4′ being suitably shaped to grasp the intended support. Supported on the extension members 5 at their upper extremities are bushings 8 in which is supported a quill 9, retained by the set screws 10. Rotatably mounted in the quill is a hollow spindle 11 carrying at its inner extremity a wheel 12 and at its outer extremity a thimble 14 and a collar 15. Between the collar 15 and the end of the quill 9 is interposed an extension spring 16, effective to constrain the face of the wheel 12 against the end of the quill 9. As best seen in Fig. 8, the quill is formed with a U-shaped bayonet slot 18 in which rides a pin 19 projecting from the spindle 11 and adapted to seat in the parallel arms of the slot under tension of the spring 16. The thimble 14 supports the semaphore arm 20 which is suitably shaped and marked to provide a signaling device. Preferably, the semaphore arm is formed of two pieces of sheet metal stamped to provide a channel-way 21 when the two parts are disposed together. This channel-way is expanded at its lower portion to provide a housing 22 for a lamp socket 24, and a lamp housing 25 providing a support for translucent bull's-eyes 26 arranged to cover the lamp 27 on the front and back sides of the semaphore arm. The thimble 14 is provided with an angle channel formed to register with the channel-way 21 and the channel of the spindle 11. A bushing 28 mounted on the quill 9 forms a covering for the spring 11 in which the collar 15 may move. By retraction of the spindle 11 against the influence of the spring 16, the pin 19 may be drawn from one of the retaining arms of the slot 18 to permit rotation of the spindle 11, and thereby swing the semaphore arm through the desired angle. Release of the hand wheel 12 permits the spring 16 to seat the pin 19 in another arm of slot 18, whereby the semaphore arm is held in the intended position. Obviously, the extent to which the semaphore arm may be swung is determined by the length of slot 18, so that in its ineffective position, the semaphore arm may be retained in a vertical position, as shown at the right of Fig. 1, or at an inwardly disposed horizontal position as shown at the right of Fig. 3; or the extent of the slot 18 may be such as to retain the semaphore arm in its effective position as shown at the left of Figs. 1 and 3, wherein it extends laterally from the body of the vehicle. The semaphore mounting thus arranged is adapted for manual operation through manipulation of the wheel 12. The device may be mounted on a wall portion, as illustrated in Figs. 3 and 9, by making a passage through the same for the accommodation of the quill 9, which is retained in place by mounting the members 8 one on the outside and one on the inside of the wall, and securing them by a through bolt in the portions 5.

As a means for effecting mechanical operation of the semaphore arms, an arrangement such as that illustrated in Fig. 9 may be provided. In this arrangement the wheel 12 is in the form of a sprocket 12′ fixed on the rotatable spindle 11 which carries the semaphore arm, and the positive retaining means illustrated by the slot 18 and pin 19 is omitted. Rotation of the sprocket wheel 12′ may be effected by operation of a suitable device such as the chain 30, meshed with the teeth of the sprocket wheel and led around idler sheaves 31 to a manipulating device 32, suitably mounted at a position convenient for manipulation by the operator. As best illustrated in Figs. 11, 13 and 14, this manipulating device includes a pair of conjoined sprockets 34 rotatably mounted on a post 35 supported in a suitable housing 36 closed by the face plate 33. Conjoined to said post is a driven member 38, which may be in the form of a friction pulley, a spur gear or the like. The chains 30 engaging the sprocket wheels 12′ are meshed severally with the sprockets 34. On a post 39 supported on the housing 36 is rotatably mounted a driving member 40, the ratio of said driving and driven members preferably being compounding, so that the speed of the driven member 38 is greater than that of the driving member 40. In the arrangement shown, the connection of these members is by means of a belt 41, and operation of the driving member is effected through manipulation of a lever 42 extending exteriorly of the housing 36. The sides of the housing 36 are apertured for the passage of the chains 30. Rotation of the driving member 40, therefore, will effect rotation of the driven member 38, transmit the chain 30 to rotate the sprocket 12' and swing the semaphore arm. As a means for holding the semaphore arm in the intended position, a handle 42 is provided with a detent comprising a tappet rod 45 constrained by a spring 46 so that its lower end is adapted to engage selectively in seats 47 formed in a guide 49 supported on the face plate of the housing 36. The upper extremity of the tappet rod is engageable by the hand in conjunction with the operation of the lever 42, to permit its retraction out of a seat 47. This retaining means is utilized in the mechanically operated installations in place of the slot and pin 18—19 of the hand operated form. The weight of the semaphore arms operates to return them to vertical position when the lever 42 is free.

Obviously, the arrangement of the chains 30 relative to the sprockets 34 and 12' may be such that the semaphore arms mounted at the opposite sides of the vehicle may be swung simultaneously in the same lateral direction, or in opposite lateral directions.

The extent of movement of the handle 42 is controlled by suitable stops 48, here formed by the ends of an arcuate slot in the face plate of the housing 36. Dependent upon the extent of movement of the arm 42, and the gear ratio between the driving member 40 and the driven member 38, the permissive extent of movement of the arm 42 may be such as to swing the semaphore arms 20 from a vertical position to a horizontal position through an arc of 90°, or from a horizontal position to a horizontal position through 180°. In the latter event an intermediate position of the arm 42 will be effective to dispose the semaphore arms in the vertical position, and then may be swung either inwardly to a horizontal position or outwardly to a horizontal position, depending upon the direction of the movement of the arm 42. By this arrangement, when the semaphore arms are articulated with the manipulating mechanism so that both will be swung in the same direction concomitantly, the direction of an intended turn of the vehicle may be indicated by the direction in which the semaphore arms are swung. When the articulation is such that the semaphore arms are swung in opposite direction concomitantly, both will be swung outwardly from the car body upon operation of the manipulating mechanism, so that signals visible from a following vehicle will be displayed on both sides of the vehicle body.

As a means for permitting operation of the semaphore arms severally, the manipulating mechanism may be modified as illustrated in Fig. 12. In this arrangement the chain driving sprockets 34' are rotatable separately upon a rod 50, shiftable longitudinally and keyed for rotation with the driven gear member 38. A suitable spacer 51 engaging the cover plate of the housing holds the sprocket wheels 34' against longitudinal movement. The rod 50 has a hand engageable portion 52 whereby it may be shifted and carries a clutch lug 54 engageable in longitudinal slot ways or notches 55 in the sprockets 34'. By properly positioning the rod 50 longitudinally, therefore, both of the sprockets may be clutched to the gear 38 or one of such sprockets may be rendered free and the other clutched for rotation with the gear member 38, so that only the semaphore arm having a chain connection with the engaged sprocket wheel will be swung upon operation of the handle 42. The position of the rod 50 is controlled by suitable detent means, illustrated at 53.

Inasmuch as the lamps carried by the semaphore arms will ordinarily be energized from the battery or electrical system of the vehicle, it is important that they be effective when the signal is used and, for the purpose of conserving power, that they be off when the signal is not in use. At the same time, inasmuch as attention is more readily attracted by a moving signal than by a stationary signal, it is desirable that the lamps be energized while the semaphore arms are in motion to indicating position. To accomplish this result, I provide the switch closing arrangement illustrated in Fig. 10. In this illustration the character S designates the source of electrical energy, connected by suitable circuit wires 60 with the lamps in the semaphore arms. Such connection may be led into the semaphore arms in the manner illustrated in Fig. 5, wherein the numeral 61 designates an insulating sheath led through the bore of spindle 11 and thimble 14 and the channel way 21 of the semaphore arm, to the lamp socket 24, and carrying the conductors 62 which are suitably connected with the circuit wires 60. The manipulating device 32 includes a pair of contact members 64 disposed at opposite sides of the lever 42 and connected with a circuit wire 65 joining the lamps. They may be mounted on inner side of the face plate 33. The lever 42 carries a swinging contact member 66 adapted to make electrical connection with either of the contacts 64 upon the swinging of the arm 42 to a lateral position incident to operation of the semaphore arms. The relationship of the contact member 64 relative to the lever stop portions 48, however, is such that the contact member 66 closes the electrical connection before the lever reaches its extreme effective position. The contact member 66 being connected with the pole of the battery opposite to that with which the contact members 64 are connected, its engagement with either of the latter members will be effective to close the circuit through the lamps, so that they will be energized before the semaphore arms reach their indicating positions and while they are being moved to said positions. The extent of the contact member 66 permits movement of the lever 42 to its extreme position after the electrical connection has been established. Thus, the lamps will be burning while the semaphore arms are being moved to indicating position, this being effective to attract attention to the signal. The wiring may be arranged, in an obvious fashion, to effect the lighting of the lamp on the outwardly swung arm only.

From the foregoing it will be obvious that my invention is adaptable to a great variety of special uses of such a device, both as to the place or position of its installation and the method of its operation, without requiring extensive special changes or equipment. The semaphore arms may be operated conjointly or severally, by hand or by proper manipulating means disposable conveniently to the operator of the vehicle; the same apparatus may be used to indicate the direction of intended movement of the vehicle, or to display proper signals at both sides of the vehicle; it may be utilized effectively in the dark without material demand upon the lamp energizing battery; and when properly disposed on a vehicle the indicating members may be arranged so as to be inconspicuous when not in signaling position, so that the appearance of the vehicle is not in any manner detracted from.

While I have shown certain arrangements of the device and of the manipulating mechanism, it is obvious that the indicating members may be disposed in different positions, such as on the rear part of the vehicle, and operated by suitable connections from the driver's seat. When the semaphore arms are arranged to swing across a portion of the windshield, it is obvious that they may be equipped with rearwardly projected wipers shown by the dotted lines W in Fig. 4, such as a movable fin, which will be effective when the semaphore arm is swung, to wipe across a portion of the surface of the windshield to remove water or dust adhering thereto and give the driver a view space.

I claim:

1. The combination with a vehicle body, of semaphore arms mounted on portions thereof at opposite sides for swinging movement to laterally extended and depending positions, manipulating means operable within the vehicle body for swinging said arms conjointly to extended position against the influence of gravity, and means effective upon the manipulating means to retain the arms in extended position against the influence of gravity.

2. The combination with a vehicle body, of semaphore arms mounted on opposite sides for swinging movement exteriorly thereof, and manipulating means operable within the body for swinging said arms to signaling positions severally and conjointly.

In testimony whereof I have hereunto signed my name in the presence of two sub scribing witnesses.

AUGUST WESSIG

Witnesses:
C. S. BUTLER,
FRANCES K. GILLESPIE.